Inventors:
Elmo E. Moyer,
August Schmidt, Jr.,
by Harry E. Dunham
Their Attorney.

Patented June 1, 1943

2,320,790

UNITED STATES PATENT OFFICE 2,320,790

ELECTRIC VALVE CIRCUITS

Elmo E. Moyer, Scotia, and August Schmidt, Jr., Niskayuna, N. Y., assignors to General Electric Company, a corporation of New York Application February 3, 1942, Serial No. 429,383

11 Claims. (Cl. 175—363)

Our invention relates to electric valve circuits and more particularly to control or excitation circuits for electric valve apparatus of the type employing ionizable mediums such as gases or vapors.

In the use of electric valve apparatus of the controlled type which comprises a control member for determining or controlling the amount of current transmitted thereby, it is frequently desirable to provide control apparatus which produces a control voltage of peaked wave form in order to obtain the desired precision of control of an electrical condition, such as the voltage or current of an associated circuit.

In accordance with the teachings of our invention described hereinafter, we provide new and improved circuits whereby precise control of electric valve apparatus is obtained and which accomplish this result without imposing an inordinate burden on the control member of the electric valve means.

It is an object of our invention to provide new and improved electric valve translating apparatus.

It is another object of our invention to provide new and improved control or excitation circuits for electric valve translating apparatus.

It is a further object of our invention to provide new and improved electric valve control circuits whereby impulses of current of peaked wave form are produced and accurately controllable.

Briefly stated, in the illustrated embodiments of our invention we provide new and improved control or excitation circuits of electric valve translating apparatus, and which comprises oscillatory or resonant circuits for electric discharge devices which transmit to the control members of the electric valve means or apparatus impulses of current or a single impulse of current of peaked wave form accurately controllable in magnitude and time to obtain precise control of an electrical condition, such as the voltage or current of an associated load circuit.

Figure 1:
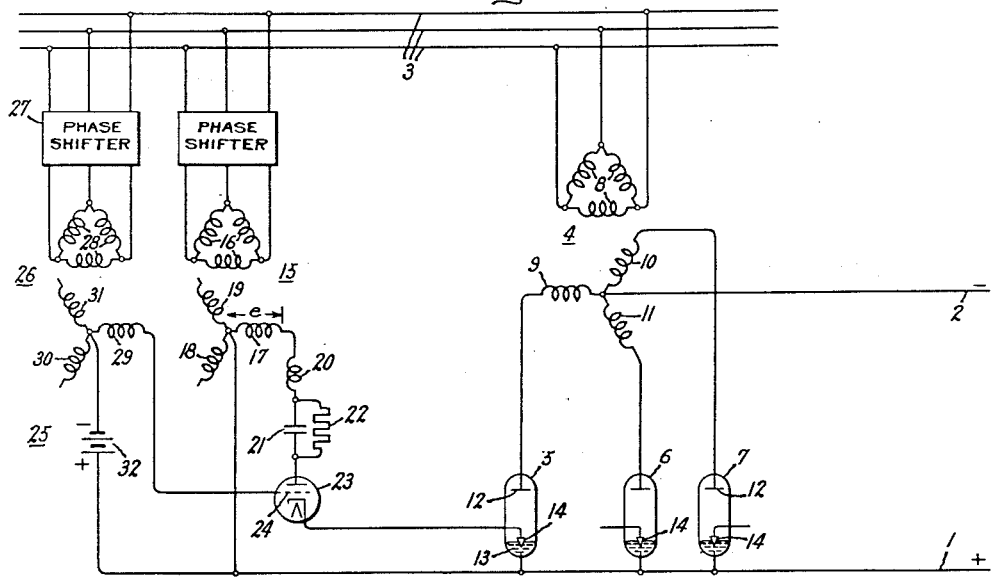
Figure 4:
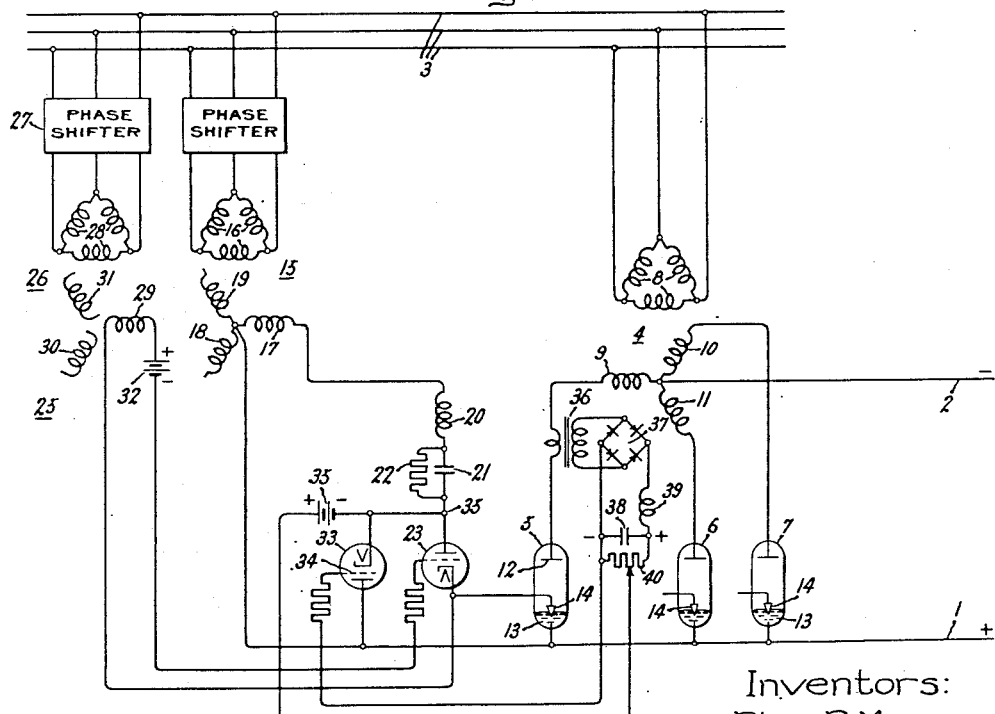
Figure 2:
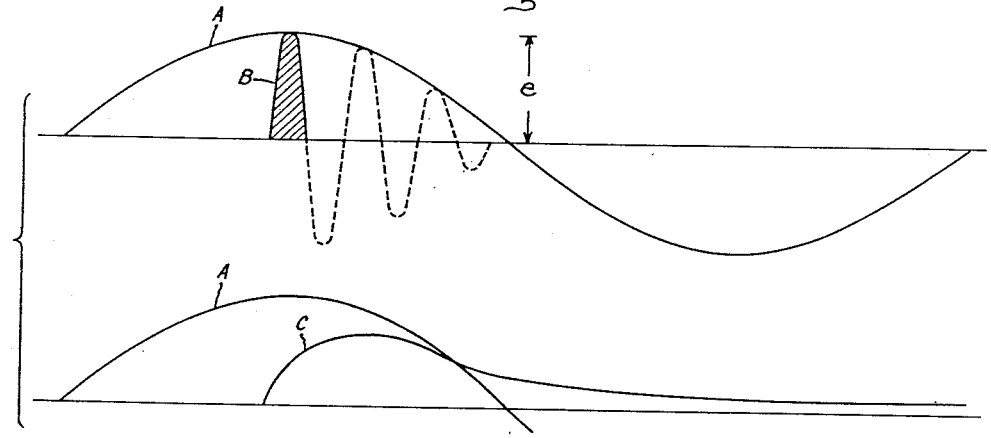
Figure 3:
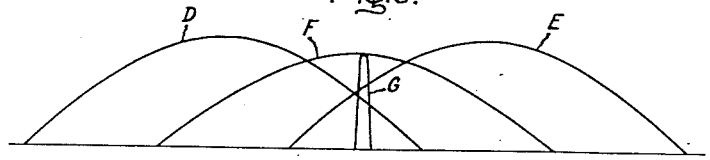
Figure 5:
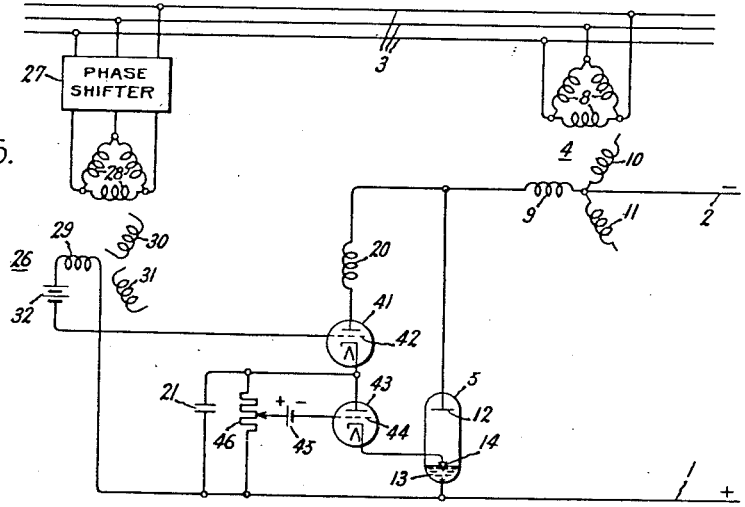

For a better understanding of our invention, reference may be had to the following description taken in connection with the accompanying drawings, and its scope will be pointed out in the appended claims. Fig. 1 diagrammatically illustrates an embodiment of our invention as applied to a polyphase electric valve rectifying system, and Figs. 2 and 3 represent certain operating characteristics thereof. Fig. 4 diagrammatically illustrates a further embodiment of our invention in which a series of impulses of voltage of peaked wave form are transmitted to the control member of an electric valve until the electric valve is rendered conducting. Fig. 5 is a further modification of the arrangement shown in Fig. 1.

Referring now to Fig. 1 of the drawings, our invention is there illustrated as applied to a system for effecting energization of a load circuit, such as a direct current load circuit comprising a positive conductor 1 and a negative conductor 2, from an alternating current supply circuit 3 through electric translating apparatus which may comprise a transformer 4 and a plurality of electric valves 5, 6 and 7. The transformer 4 comprises a plurality of primary windings 8 and secondary windings 9, 10 and 11 which may be connected in a conventional wye arrangement.

The electric valve means 5, 6 and 7 are preferably of the type employing an ionizable medium, such as a gas or a vapor, and each comprises an anode 12, a cathode 13 and may include a control member, such as an immersion-igniter type control member 14 associated with the cathode 13. The control member 14 is constructed of a material, such as boron carbide or silicon carbide or other suitable material, having an electrical resistivity which is substantially greater than that of the associated cathode 13. Arc discharges between the anodes 12 and the cathodes 13 are established by transmitting to the control members 14 a current of predetermined value which establishes a cathode spot on the surface of the mercury pool cathode 13.

We provide excitation means for transmitting to the control members 14 impulses of unidirectional current of a magnitude which is sufficient to render the electric valve means conducting. The excitation means comprises a transformer 15 which is energized preferably from the alternating current circuit 3, and which may include a plurality of primary windings 16 and secondary windings 17, 18 and 19. In Fig. 1 only the details of the excitation circuit for the electric valve means 5 are illustrated.

We provide an oscillatory or resonant circuit having a natural frequency substantially greater than the frequency of the alternating current circuit 3 in order to transmit to the control member 14 of the electric valve means 5 an impulse of current, of relatively short duration, in order that the electric valve means 5 may be rendered conducting precisely at a predetermined time. More specifically, we employ a resonant circuit of the series type comprising a serially connected inductance 20 and a capacitance 21. A discharge circuit, which may comprise a resistance 22, is connected across the capacitance 21. As a means for initiating operation of the excitation means and more particularly the resonant circuit, we connect in series relation with the resonant circuit and the control member 14 of electric valve means 5 an electric discharge device 23 which also may be of the type employing an ionizable medium, such as a gas or a vapor, and which comprises a control grid 24 to determine the time at which the impulse of current is transmitted to the control member 14 during the cycle of applied anode-cathode voltage.

The precise control of the time at which the electric discharge device 23 is rendered conducting and hence the time at which the electric valve means 5 is rendered conducting, may be determined by means of a control circuit 25 which is energized from the alternating current circuit 3 through a transformer 26 and a phase shifting device 27. Transformer 26 is provided with a plurality of primary windings 28 and secondary windings 29, 30 and 31. The electric discharge device 23 is normally maintained non-conducting by suitable biasing means, such as a battery 32, which impresses on the grid 24 a negative unidirectional biasing potential. During each cycle when the alternating voltage produced by winding 29 attains a predetermined value sufficient to overcome the effect of battery 32, the discharge device 23 is rendered conducting.

While only the excitation means for the electric valve means 5 has been illustrated, it will be understood that resonant circuits and electric discharge devices are also employed for the energization of control members 14 of electric valve means 6 and 7 from windings 18 and 19, respectively. In like manner, the secondary windings 30 and 31 of transformer 26 are employed to control the conductivities of the electric discharge devices which are connected to control the time of energization of control members 14 of electric valve means 6 and 7.

It will be understood, in accordance with the teachings of our invention, that the natural frequency of the resonant circuit is substantially higher than the frequency of the alternating current supply circuit 3. Where the supply circuit 3 is a source of current of commercial frequency, such as 60 cycles, we have found that successful control of the electric valve means 5, 6 and 7 may be obtained by designing the resonant circuit to have a natural frequency in the neighborhood of 1000 cycles.

The value of resistance 22 is preferably chosen so that the capacitance 21 substantially discharges within one cycle of the voltage of circuit 3.

The operation of the embodiment of our invention shown in Fig. 1 will be explained by considering the system when it is operating to transmit unidirectional current to the direct current load circuit. The electric valve means 5, 6 and 7 conduct current in a predetermined order determined by the phase rotation of windings 9, 10 and 11, and the magnitude of the voltage transmitted to the load circuit is determined by the time during the respective positive half cycles of anode-cathode voltage at which the electric valve means are rendered conducting. As the electric valve means are rendered conducting at later times during the respective positive half cycles of anode-cathode voltage, the magnitude of the voltage supplied to the load circuit is, of course, decreased, and as these times are advanced the magnitude of the load is increased.

The excitation means for the electric valve means 5, 6 and 7 transmit impulses of current of peaked wave form to the control members 14 in the proper order so that the electric valve means 5, 6 and 7 conduct current in the desired order or sequence. Considering the electric valve means 5 in particular, at the desired instant during a positive half cycle of applied anode-cathode voltage, electric discharge device 23 is rendered conducting by the alternating voltage produced by winding 29. Due to the design of the circuit including inductance 20 and capacitance 21, an impulse of current is transmitted to control member 14 from winding 17. The impulse of current is of relatively short duration due to the natural frequency of this circuit. During this operation the capacitance 21 is charged, thereby preventing the transmission of any further impulse of current to the control member 14. Due to the fact that the electric discharge device 23 is unidirectional, only one impulse, that is, the positive impulse of current, will be transmitted to control member 14. Discharge circuit comprising resistance 22 is arranged to effect substantial discharge of capacitance 21 within a period of time somewhat less than one cycle of voltage of circuit 3, so that the excitation circuit is in condition to transmit another impulse of current to control member 14 of electric valve means 5 at the proper time during the next succeeding cycle.

For a better understanding of the operation of the excitation circuit shown in Fig. 1, reference may be had to Figs. 2 and 3. Curve A represents the voltage produced by secondary winding 29. Curve B represents the nature of the oscillatory current which the circuit would tend to produce were it not for the electric discharge device 23. Due to the presence of this discharge device only the solid and shaded portion of curve B is transmitted to the control member 14; that is, only a single unidirectional impulse of current is transmitted to the control member. Where the circuit comprising inductance 20 and capacitance 21 is of the non-oscillatory type, the current transmitted to control member 14 would assume the form represented by curve C of Fig. 2. It will be appreciated that the magnitude and duration of curve C may be controlled by the design of the circuit. The advantage of employing an oscillatory circuit to have a characteristic such as that represented by curve B will be readily appreciated due to the sharpness and close definition of the positive unidirectional impulse represented by the shaded portion of curve B.

In Fig. 3, curve D represents the voltage of winding 9 associated with electric valve means 5, and curve E represents the voltage of winding 10 associated with the electric valve means 7, it being assumed that the phase rotation of the windings 9–11, inclusive, is clockwise. Curve F represents the voltage of secondary winding 17 which supplies, through the resonant circuit, the excitation current to control member 14 of electric valve means 5. The peaked curve G represents the excitation current transmitted to control member 14 of electric valve means 5 and, of course, is produced by the resonant circuit and corresponds to the shaded portion of curve B in Fig. 2.

Referring to Fig. 4, a further modification of our invention is there illustrated which is a modification of the arrangement shown in Fig. 1 and corresponding elements have been assigned like reference numerals. In this modification of our invention, we provide means for effecting the transmission to the control members 14 of electric valve means 5, 6 and 7 a number of impulses of unidirectional current from the associated resonant circuits until the respective associated electric valve means begin to conduct current, thereby assuring the desired firing or control of the electric valve means.

Considering the excitation circuit for the electric valve means 5, we employ in this excitation circuit a second electric discharge device 33 which also may be of the type employing an ionizable medium, such as a gas or a vapor, and which is provided with a control grid 34. The discharge device 33 is connected between the common juncture 35 of capacitance 21 and discharge device 23 and the cathode 13 of the electric valve means 5. The discharge device 33 is poled in opposition to the electric discharge device 23 so that the resonant circuit may oscillate. However, due to the connection of the discharge devices 23 and 33, while the resonant circuit may oscillate only unidirectional impulses of current are transmitted to control member 14. The discharge device 33 is normally maintained in a conducting condition by suitable means, such as a battery 35, which impresses on control grid 34 a positive firing voltage, and this voltage remains effective until the electric valve means 5 is rendered conducting. As a means for rendering the discharge device 33 nonconducting and to end thereby the period of energization of the control member 14, we provide means responsive to the current transmitted in the anode-cathode circuit of electric valve means 5 for producing a voltage to overcome the effect of the voltage produced by battery 35. This means may comprise a current responsive means, such as a transformer 36, a rectifier 37, a capacitance 38, an inductance 39, and a voltage divider 40 which is connected across the terminals of the capacitance 38.

The arrangement shown in Fig. 4 operates to render the electric valve means 5, 6 and 7 conducting in a predetermined order so that unidirectional current is transmitted to the direct current load circuit. Considering the operation of the electric valve means 5 in particular, the initiation of the energization of control member 14 is determined by the electric discharge device 23 which is rendered conducting at a predetermined time during the cycle of voltage of circuit 3 by the alternating voltage produced by winding 29 of transformer 26. This time may be adjusted or controlled by means of phase shifter 27. When the electric discharge device 23 is rendered conducting, a positive impulse of current is transmitted to control member 14 through electric discharge device 23. If the electric valve means 5 is not rendered conducting by virtue of the single energization of control member 14, a series of impulses of current will be transmitted to the control member. The electric discharge device 33, by virtue of its connections, permits the resonant circuit including inductance 20 and capacitance 21 to oscillate. However, due to the connection of discharge device 23 and discharge device 33, only positive impulses of current will be transmitted to control member 14. Impulses of current of peaked wave form of relatively short duration will be transmitted to control member 14 until electric valve means 5 is rendered conducting. As soon as an arc discharge is established between the anode and cathode of electric valve means 5, capacitance 38 will be charged through rectifier 37 and transformer 36 to impress on grid 34 of discharge device 33 a negative voltage which is sufficient to overcome the effect of the voltage produced by battery 35 and the discharge device 33 will be rendered nonconducting, thereby ending the energization of the control member 14 and relieving the duty imposed on the control member. More specifically, continued oscillation of the resonant circuit will be prevented when the electric discharge device 33 is rendered nonconducting.

The voltage divider 40 is preferably designed to have a value of resistance such that the capacitance 38 maintains a sufficient biasing voltage on grid 34 until the biasing potential produced by battery 32 becomes effective to maintain the discharge device 23 nonconducting. In this manner the transmission to the control member 14 of a successive number of impulses of voltage of peaked wave form is obtained in order to assure positive ignition of the electric valve means.

In Fig. 5 a further modification of our invention is illustrated as applied to an electric translating system employing electric valve means, and wherein anode-voltage responsive circuits for energizing and immersion-igniter control members 14 are employed. Only one electric valve means of the translating apparatus and its associated excitation circuit is illustrated.

We provide a resonant circuit energized from winding 9 which also energizes the anode-cathode circuit of the electric valve means 5, and this resonant circuit comprises inductance 20 and capacitance 21 interconnected through an electric discharge device 41. The resonant circuit is also preferably designed to have a natural frequency substantially greater than the frequency of the supply circuit 3 in order to assure the transmission of a sharp impulse of current of peaked wave form to control member 14. The electric discharge device 41 may be of the type comprising an ionizable medium and comprising a grid 42 which renders the discharge device 41 conducting at a predetermined time by virtue of the alternating voltage impressed thereon by means of secondary winding 29 of transformer 26. The transmission of the impulse of peaked current to control member 14 is effected by means of the electric discharge device 43 which is connected between the discharge device 41 and the control member 14. The conductivity of discharge device 43 is controlled in response to a predetermined electrical condition of the resonant circuit, such as the voltage of capacitance 21. The discharge device 43 is provided with a grid 44 which is normaly biased to a negative potential by means of battery 45. Means responsive to the voltage of capacitance 21, such as a voltage divider 46, is provided to render the discharge device 43 conducting when the voltage of capacitance 21 attains a predetermined value.

In the arrangement of Fig. 5 the energization of the resonant circuit from winding 9 is initiated slightly in advance of the time at which it is desired to render the electric valve means 5 conducting. The time of initiation of the energization of the resonant circuit may be controlled by means of the phase shifter 27. As soon as the capacitance 21 attains a predetermined value, discharge device 43 is rendered conducting thereby effecting discharge of capacitance 21 through control member 14 of electric valve means 5 and effecting the establishment of an arc discharge within the electric valve means and causing it to conduct current. In this manner the advantages of employing a resonant circuit are obtained without necessitating a separate source of current for energizing the resonant circuit.

While we have shown and described our invention as applied to particular systems of connections and as embodying various devices diagrammatically shown, it will be obvious to those skilled in the art that changes and modifications may be made without departing from our invention, and we therefore aim in the appended claims to cover all such changes and modifications as fall within the true spirit and scope of our invention.

What we claim as new and desire to secure by Letters Patent of the United States, is:

1. In combination, an alternating current supply circuit, a load circuit, electric translating apparatus connected between said circuits and comprising electric valve means having a control member requiring the passage of a predetermined minimum current therethrough for rendering said electric valve means conductive, and an excitation circuit energized from said supply circuit and comprising in series with said supply circuit a series resonant circuit having a natural frequency substantially greater than the frequency of said supply circuit and an electric discharge device connected in series relation with said resonant circuit and said control member.

2. In combination, an alternating current supply circuit, a load circuit, electric translating apparatus connected between said circuits and comprising an electric valve means having a control member of the immersion-igniter type, and an excitation circuit energized from said supply circuit and comprising in series with said supply circuit a series resonant circuit having a natural frequency substantially greater than the frequency of said supply circuit and an electric discharge device connected in series relation with said resonant circuit and said control member for transmitting thereto an impulse of unidirectional current.

3. In combination, an alternating current supply circuit, a load circuit, electric translating apparatus connected between said circuits and comprising electric valve means having a control member of the immersion-igniter type, and an excitation circuit energized from said supply circuit and comprising a series resonant circuit having a natural frequency substantially greater than the frequency of said supply circuit including an inductance and a capacitance, a discharge circuit across said capacitance, an electric discharge device connected in series relation with said control member and said resonant circuit and means for controlling the conductivity of said electric discharge device to transmit a peaked impulse of unidirectional current to said control member.

4. In combination, an alternating current supply circuit, a load circuit, electric translating apparatus connected between said circuits and comprising electric valve means having an anode, a cathode and a control member, means energized from said supply circuit comprising a resonant circuit, an electric discharge device connected between said resonant circuit and said control member, a second electric discharge device connected across the first mentioned discharge device and the cathode, and means for controlling the conductivities of said electric discharge devices to transmit a number of impulses of current to said control member.

5. In combination, an alternating current supply circuit, a load circuit, electric translating apparatus connected between said circuits and comprising electric valve means having an anode, a cathode and a control member, means energized from said supply circuit and comprising a series resonant circuit having a frequency substantially greater than the frequency of said supply circuit, an electric discharge device connected in series relation with said resonant circuit and said control member for transmitting unidirectional impulses of current thereto, a second electric discharge device connected across the first mentioned discharge device and said cathode and being poled opposite to the first mentioned discharge device, and means for controlling the conductivity of the first mentioned electric discharge device to initiate energization of said control member at a predetermined time during each cycle of anode-cathode voltage.

6. In combination, an alternating current supply circuit, a load circuit, electric translating apparatus connected between said circuits and comprising electric valve means having an anode, a cathode and a control member, means energized from said supply circuit and comprising a series resonant circuit, means for transmitting impulses of unidirectional current from said resonant circuit to said control member and comprising an electric discharge device, a second electric discharge device poled opposite to the first mentioned discharge device and connected across said cathode and the first mentioned discharge device for permitting oscillation of said resonant circuit, means for controlling the conductivity of the first mentioned discharge device to initiate energization of said control member, and means responsive to the flow of current in the anode-cathode circuit of said electric valve means for rendering said second discharge device nonconducting.

7. In combination, an alternating current supply circuit, a load circuit, electric translating apparatus connected between said circuits and comprising electric valve means having an anode, a cathode and a control member, means energized from said supply circuit and comprising a series resonant circuit having a natural frequency substantially greater than the frequency of said supply circuit, an electric discharge device connected between said resonant circuit and said control member for transmitting thereto impulses of unidirectional current, a second electric discharge device connected across said cathode and the first mentioned discharge device for permitting oscillation of said resonant circuit, means for controlling the conductivity of the first mentioned discharge device to effect energization of said control member at a predetermined time during each cycle of voltage of said supply circuit, means tending to maintain said second discharge device conducting, and means responsive to the flow of current in the anode-cathode circuit of said electric valve means to render said second discharge device nonconducting thereby ending the period of energization of said control member.

8. In combination, an alternating current supply circuit, a load circuit, electric translating apparatus connected between said circuits and comprising electric valve means having an anode, a cathode and a control member of the immersion-igniter type, means connected between said anode and said control member comprising an inductance and a pair of serially connected electric discharge devices, a capacitance connected between the common juncture of said discharge devices and said cathode, said capacitance and said inductance consituting a resonant circuit having a natural frequency substantially greater than that of said supply circuit, means for controlling the conductivity of one of the discharge devices to set said resonant circuit in oscillation, and means responsive to the operation of said resonant circuit for rendering the other of said discharge devices conducting and thereby effecting the transmission of a unidirectional impulse of current to said control member.

9. In combination, an alternating current supply circuit, a load circuit, electric translating apparatus connected between said circuits and comprising a winding energized from said supply circuit and an electric valve means connected to said winding and having an anode, a cathode and a control member, means connected between said anode and said control member and comprising an inductance and a pair of serially connected electric discharge devices, a capacitance connected between the common juncture of said discharge devices and said cathode, said capacitance and said inductance constituting a resonant circuit energized from said winding and having a natural frequency substantially greater than that of said supply circuit, means for controlling the conductivity of that electric discharge device connected between said inductance and said capacitance, and means responsive to the voltage of said capacitance for rendering the other discharge device conducting thereby effecting the transmission of a unidirectional impulse of current to said control member.

10. In combination, an alternating current supply circuit, a load circuit, electric translating apparatus connected between said circuits and comprising a winding energized from said supply circuit and electric valve means energized from said winding and including an anode, a cathode and a control member, means energized from said winding and connected across said anode and said cathode and comprising in series relation an inductance, an electric discharge device and a capacitance, a second electric discharge device connected between said control member and the common juncture of the first mentioned discharge device and said capacitance, means for rendering the first mentioned discharge device conducting at a predetermined time during each cycle of voltage of said supply circuit, and means responsive to the voltage of said capacitance for rendering the second discharge device conducting and thereby effect the transmission of a unidirectional impulse of current to said control member.

11. In combination, an alternating current supply circuit, a load circuit, electric translating apparatus connected between said circuits and comprising a winding energized from said supply circuit and an electric valve means energized from said winding and including an anode, a cathode and a control member, means energized from said winding and connected across said anode and said cathode and comprising in series relation an inductance, an electric discharge device and a capacitance, a second electric discharge device connected between said control member and the common juncture of the first mentioned discharge device and said capacitance, means for rendering the first mentioned discharge device conducting at a predetermined time during each cycle of voltage of said supply circuit, and means responsive to an electrical condition of said resonant circuit for rendering the second electric discharge device conducting and for effecting thereby the transmission of a unidirectional impulse of current to said control member.

ELMO E. MOYER.
AUGUST SCHMIDT, Jr.